US012381914B2

United States Patent
Sixta et al.

(10) Patent No.: US 12,381,914 B2
(45) Date of Patent: Aug. 5, 2025

(54) DETECTING MALICIOUS EMAIL ATTACKS BASED ON ENTITY IMAGE ANALYSIS

(71) Applicant: Cisco Technology, Inc., San Jose, CA (US)

(72) Inventors: Tomas Sixta, Prague (CZ); Filip Srajer, Hradec Kralove (CZ)

(73) Assignee: Cisco Technology, Inc., San Jose, CA (US)

( * ) Notice: Subject to any disclaimer, the term of this patent is extended or adjusted under 35 U.S.C. 154(b) by 320 days.

(21) Appl. No.: 18/192,453

(22) Filed: Mar. 29, 2023

(65) Prior Publication Data

US 2024/0333762 A1    Oct. 3, 2024

(51) Int. Cl.
*H04L 9/40* (2022.01)
*G06F 40/30* (2020.01)
*G06V 10/40* (2022.01)

(52) U.S. Cl.
CPC .......... *H04L 63/1483* (2013.01); *G06F 40/30* (2020.01); *G06V 10/40* (2022.01); *G06V 2201/09* (2022.01)

(58) Field of Classification Search
CPC ..... H04L 63/1483; G06F 40/30; G06V 10/40; G06V 2201/09
See application file for complete search history.

(56) References Cited

U.S. PATENT DOCUMENTS

| | | | |
|---|---|---|---|
| 10,601,865 B1 | 3/2020 | Mesdaq et al. | |
| 2019/0319905 A1 | 10/2019 | Baggett et al. | |
| 2020/0036751 A1 | 1/2020 | Kohavi | |
| 2021/0112024 A1 | 4/2021 | Everton | |
| 2021/0344711 A1* | 11/2021 | Cleveland | H04L 9/3236 |
| 2022/0174092 A1 | 6/2022 | Farjon et al. | |
| 2022/0337625 A1* | 10/2022 | Singh | G06N 3/04 |
| 2024/0333733 A1* | 10/2024 | Brabec | H04L 63/1441 |

* cited by examiner

*Primary Examiner* — Bryan Y Lee
(74) *Attorney, Agent, or Firm* — Lee & Hayes, P.C.

(57) ABSTRACT

In some aspects, the techniques described herein relate to a method for detecting malicious emails, the method including: receiving an email, wherein the email is associated with a markup payload; determining, based on the markup payload, text data associated with the email; determining, using the text data and a first machine learning model, a first representation of the email representing text associated with the email; rendering the email to generate image data that represents a rendering of the email; determining, using the image data and a second machine learning model, a second representation of the email that represents at least the rendering of the email; and determining a prediction for the email based on the first representation and the second representation, wherein the prediction represents whether the email is predicted to be malicious based on the first representation and the second representation.

20 Claims, 7 Drawing Sheets

DETECTING MALICIOUS EMAIL ATTACKS BASED ON ENTITY IMAGE ANALYSIS

TECHNICAL FIELD

The present disclosure relates generally to techniques for an email security system to detect malicious email attacks.

BACKGROUND

Electronic mail, or "email," continues to be a primary method of exchanging messages between users of electronic devices. Many email service providers have emerged that provide users with a variety of email platforms to facilitate the communication of emails via email servers that accept, forward, deliver, and store messages for the users. Email continues to be an important and fundamental method of communications between users of electronic devices as email provide users with a cheap, fast, accessible, efficient, and effective way to transmit all kinds of electronic data. Email is well established as a means of day-to-day, private communication for business communications, marketing communications, social communications, educational communications, and many other types of communications.

Due to the widespread use and necessity of email, scammers and other malicious entities use email as a primary channel for attacking users, such as by business email compromise (BEC) attacks, malware attacks, and malwareless attacks. These malicious entities continue to employ more frequent and sophisticated social-engineering techniques for deception and impersonation (e.g., phishing, spoofing, etc.). As users continue to become savvier about identifying malicious attacks on email communications, malicious entities similarly continue to evolve and improve methods of attack.

Accordingly, email security platforms are provided by email service providers (and/or third-party security service providers) that attempt to identify and eliminate attacks on email communication channels. For instance, cloud email services provide secure email gateways (SEGs) that monitor emails and implement pre-delivery protection by blocking email-based threats before they reach a mail server. These SEGs can scan incoming, outgoing, and internal communications for signs of malicious or harmful content, signs of social engineering attacks such as phishing or business email compromise, signs of data loss for compliance and data management, and other potentially harmful communications of data. However, with the rapid increase in the frequency and sophistication of attacks, it is difficult for email service providers to maintain their security mechanisms at the same rate as the rapidly changing landscape of malicious attacks on email communications.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
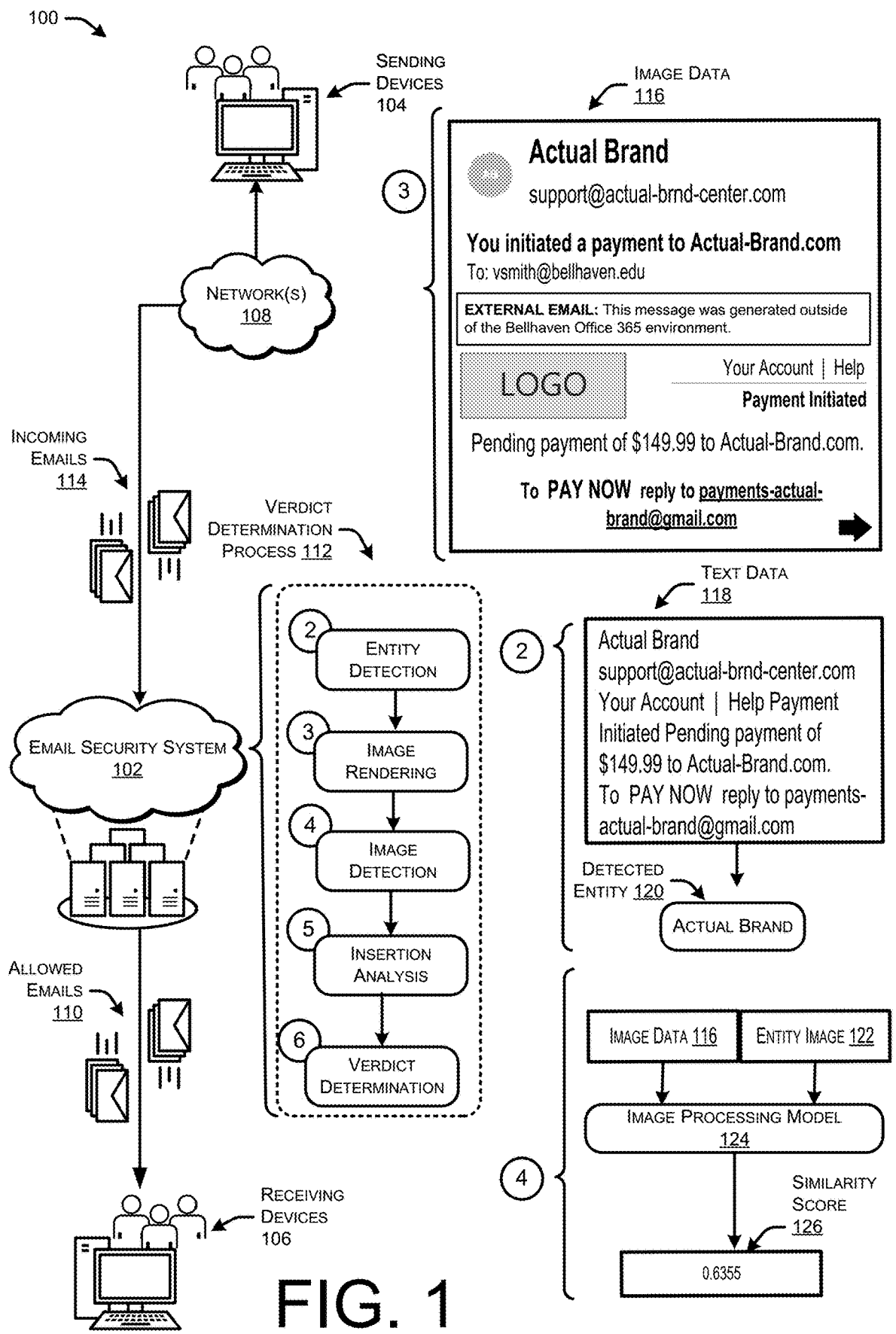
FIG. 1 illustrates a system architecture of an example email security system.

This disclosure describes techniques for an email security system to detect malicious email attacks. In some aspects, the techniques described herein relate to a method for detecting malicious emails, the method including: receiving an email, wherein the email is associated with a markup payload; determining, based on the markup payload, text data associated with the email; determining, using the text data and a first machine learning model, a first representation of the email representing text associated with the email; rendering the email to generate image data that represents a rendering of the email; determining, using the image data and a second machine learning model, a second representation of the email that represents at least the rendering of the email; and determining a prediction for the email based on the first representation and the second representation, wherein the prediction represents whether the email is predicted to be malicious based on the first representation and the second representation.

Additionally, the techniques described herein may be performed by a system and/or device having non-transitory computer-readable media storing computer-executable instructions that, when executed by one or more processors, performs the method described above.

EXAMPLE EMBODIMENTS

This disclosure describes techniques for an email security system to detect whether an email is malicious. In some cases, the email security system determines whether the email discusses a first entity (e.g., a first brand) based on text data associated with an email. Afterward, based on (e.g., in response to) determining that the email discusses the first entity, the email security system may render a markup payload associated with the email to generate image data associated with the email. After generating the image data, the email security system may determine whether the email comprises a first image associated with the first entity based on the image data. Subsequently, based on (e.g., in response to) determining that the email comprises the first image associated with the first entity, the email security system may determine a prediction about the email. The prediction may represent whether the email security system has predicted that the email is malicious. The email security system may determine the prediction based on one or more factors, such as based on at least one of the following: (i) whether the first image is attached to the email as an image file, (ii) whether the first image is associated with a first uniform resource locator (URL) in the first markup payload, (iii)

whether the first image is associated with a style sheet code segment in the email's markup payload, or (iv) whether the first image is associated with a drawing code segment in the email's markup payload.

The techniques described herein may enable various practical applications and technical improvements to the security of an email system. For example, in some cases, the email security system determines a recommended action to perform concerning the email based on the prediction for the email. For example, in some cases, based on determining that the email is malicious, the email security system recommends that the email security system prevents the email from reaching the inbox of the email's recipient. As another example, in some cases, based on determining that the email is not malicious, the email security system recommends that the email security system provides the email in the inbox of the email's recipient.

In some cases, after the email security system receives an email, the email security system scans one or more markup payloads (e.g., one or more Hypertext Transfer Protocol (HTTP) payloads) of the email to determine text data associated with the email. After determining the text data associated with the email, the email security system may process the text data to determine whether the text data contains a discussion of a first entity. In response to determining that the text data contains such a reference, the email security system may generate image data for the email based on the markup payloads associated with the email. In some cases, given an email associated with P markup payloads, the email security system generates image data that includes P rendered images, where each rendered image is the output of rendering one of the P markup payloads. After generating the image data associated with the email, the email security system may determine whether the image data includes a first image associated with the first entity. For example, suppose the image data includes P rendered images. In that case, the email security system may determine whether at least one is sufficiently similar to one of the images (e.g., one of the logo images) associated with the first entity (e.g., associated with a first brand). In some cases, if the email security system determines that at least one of the P rendered images is sufficiently similar to one of the entity's associated images, the system determines that the image data includes a first image associated with the first entity. In some cases, if the email security system determines that none of the P rendered images is sufficiently similar to one of the entity's associated images, the system determines that the image data does not include a first image associated with the first entity.

In some cases, if the email security system determines that image data associated with the email includes a first image associated with the first entity discussed in the email, the email security system determines a prediction based on the first image. For example, the email security system may determine the prediction based on whether the email includes the first image using a URL or as an image attachment or whether the email includes the first image via drawing code segments (e.g., via Cascading Style Sheet (CSS) code or drawing functionalities provided in HTML). The prediction may represent whether the email security system predicts the email is malicious. For example, in predicting whether the email is malicious, the email security system may use a set of predictive features that include a first feature related to whether the email includes the first image using a URL or as an image attachment.

In some cases, the techniques described herein include determining text data associated with an email. In some cases, text data associated with an email include text segments associated with each markup payload of the email. For example, if one of the attachments to the email includes a markup file (e.g., an HTML file), then the text data associated with the email include both text data in the main markup payload of the email as well as the text data in the markup payload of the attachment. In some cases, the text data associated with an email include text segments associated with each webpage whose URL is in a markup payload associated with the email.

In some cases, the email is associated with a plurality of markup payloads. The text data may comprise each text data segment associated with one of the plurality of markup payloads. In some cases, the plurality of markup payloads may comprise a second markup payload associated with a first email attachment. A markup payload may comprise one or more code segments, such as HTML or Extensible Markup Language (XML) code segments, that describe the structure and content of the email.

In some cases, the text data associated with an email include data in a markup email payload associated with a payload tag configured to indicate an alphanumeric character segment. For example, the text data associated with an email may include data in an HTML payload for the email that is associated with one of the following tags: <h1></h1> or <p></p>. In some cases, the text data associated with an email include any string displayed as the email's body. In some cases, the text data associated with an email include text data associated with headers and paragraphs of the email.

In some cases, the text data associated with an email include (e.g., in addition to the text data in a payload of the email) text data associated with at least one webpage linked to in the email. In some cases, the text data associated with the email include the text data detected in the email payload and the N documents determined based on text data associated with the N webpages linked to by the email. For example, in some cases, the email security system scans the HTML payload of an email to determine if the HTML payload includes any <a> tags. In some cases, in response to determining that the HTML payload includes a set of N webpages linked to through URLs, the email security system loads the N webpages and saves the text data associated with each webpage in a document.

In some cases, the text data associated with an email include (e.g., in addition to the text data in a payload of the email) text data associated with at least one attached text-based document. For example, in some cases, the email security system scans each email attachment to determine whether the attachment is a text-based document. In some cases, the email security system determines that an attached document is text-based if the document's format indicates that the document includes text data (e.g., if the format indicates that the document has a .txt format). In some cases, the email security system determines that an attached document is text-based if the document's format indicates that the document includes image data and the image data is detected to depict text data. For example, the email security system may determine that an attached document is text-based if the format indicates that the document is an image-based Portable Document Format (PDF) document that depicts text data). In some cases, after the email security system determines that the email includes M text-based document attachments, the email security system extracts text data in each of the M text-based document attachments into a respective document. In some cases, the text data associated with the email include the text data detected in the email payload and the M documents determined based on text data associated with the M text-based document attachments of the email.

In some cases, the techniques described herein include determining whether the text data associated with the email contains a discussion of a first entity. In some cases, to determine whether the text data discusses a first entity, the email security system determines whether the text data satisfies at least one textual pattern (e.g., at least one word occurrence pattern and/or at least one regular expression pattern) associated with the first entity. In some cases, if the email security system determines that the text data satisfies at least one textual pattern associated with the first entity, the email security system determines that the email contains a discussion of the first entity. In some cases, if the email security system determines that the text data does not satisfy any textual pattern associated with the first entity, the email security system determines that the email does not contain a discussion of the first entity.

In some cases, to determine whether the text data associated with the email contains a discussion of the first entity, the email security system generates a text representation of the email and provides the text representation of the email to a regression model (e.g., a regression model with one or more neural network layers). The prediction model may then determine a score representing the likelihood that the text data contains a discussion of the first entity. In some cases, to determine the text representation of the email, the email security system processes at least a portion of the text data associated with the email using a text encoder machine learning model. An example of a text encoder machine learning model is a machine learning model that includes an attention-based text encoder layer. For example, in some cases, the text encoder machine learning model includes an attention-based text encoder layer with a self-attention mechanism trained using a language modeling task, such as a missing word detection task. In some cases, the text encoder machine learning model includes one or more conventional feedforward neural network layers.

In some cases, to determine whether the email includes a discussion of the first entity, the email security system determines an entity score for the email concerning the first entity. The entity score for the first entity may represent the computed likelihood that the email discusses the first entity. The email security system may then determine that the email discusses the first entity if the entity score exceeds an entity score threshold. In some cases, given E entities (e.g., E brands), the email security system determines E entity scores, where each entity score is associated with a corresponding entity and describes the computed likelihood that the email discusses the corresponding entity. In some cases, the email security system determines that the email discusses each entity whose corresponding entity score exceeds an entity score threshold.

In some cases, the techniques described herein include determining image data for the email. In some cases, the image data for the email includes each image generated by rendering a markup payload of the email. In some cases, the email is associated with two or more markup payloads. The image data may comprise each image generated by rendering one of the markup payloads associated with the email.

In some cases, to determine the image data for the email, the email security system renders a markup payload (e.g., an HTML payload) of the email. In some cases, one objective behind rendering the markup payload of the email is to avoid the need for processing the various complex markup elements of the markup payload, a task that has become more and more difficult with the development of more complex markup languages (e.g., HTML 5). For example, in some cases, the HTML payload of the email can have complex CSS elements, such as CSS elements that depict a visualization (e.g., a logo) in a non-image format, for example to avoid detection of the visualization by image detection models. In some cases, to avoid the need for individual processing of complex markup elements with varied visual effects, the email security system renders a markup payload of the email and uses the resulting image data to classify the email. In some cases, rendering a markup payload includes rendering the whole of the markup payload.

In some cases, to render a markup payload of an email, the email security system renders a webpage based on the markup payload and captures a screenshot of the webpage. In some cases, to render a markup payload of the email, the email security system renders a webpage based on the markup payload and prints the webpage into an image-based file (e.g., into a Joint Photographic Experts Group (JPEG) file, into a PDF file, and/or the like). In some cases, to render the markup payload of an email, the email security system provides the markup payload to a rendering engine that provides an image of the markup payload in response to the markup payload.

In some cases, the techniques described herein include determining whether the image data associated with the email includes a first image of a first entity. In some cases, if the image data includes P images, the email security system may determine that the image data includes a first image if at least one of the P images has a similarity score relative to the first image that exceeds a similarity score threshold. In some cases, given P images in the image data and G images associated with the first entity, the email security system determines P*G similarity scores, each associated with a respective image in the image data and a respective entity image. In some cases, if at least one of the similarity scores associated with an entity image exceeds the threshold, the email security system determines that the email includes that entity image. Accordingly, in some cases, an email may include more than one image associated with an entity.

In some cases, the email security system determines whether the email includes the first image associated with the first entity by (i) rendering each markup payload to generate a corresponding image, (ii) determining an image similarity score for each markup payload based on the corresponding image and the first image, and (iii) determining whether the email comprises the first image based at least in part on each image similarity score for each markup payload. In some cases, to determine an image similarity score for two images, the email security system generates an image representation for each image and provides the two image representations to an image processing model. The image processing model may, for example, include one or more neural network layers. In some cases, the image processing model is configured to process two image representations to determine a similarity score for the two images corresponding to the two image representations. In some cases, to determine the image representation of the email, the email security system processes at least a portion of the image data associated with the email using an image encoder machine learning model. An example of an image encoder machine learning model is a machine learning model with a convolutional neural network layer. In some cases, the image encoder machine learning model includes at least one feedforward fully-connected neural network layer.

In some cases, the techniques described herein include determining one or more predictions about the email based on the first image of the first entity. In some cases, after the email security system determines that the email includes the first image, the email security system determines a preliminary prediction about the markup technique used to integrate the first image into a markup payload of the email. In some cases, the email security system uses the preliminary prediction to generate a final prediction about whether the email is malicious.

For example, in some cases, if the email security system determines that the email includes the first image via a drawing code segment or a style sheet code segment, the email security system uses this determination as a feature for predicting whether the email is malicious. As another example, in some cases, if the email security system determines that the email does not include the first image via a URL or an image attachment, the email security system uses this determination as a feature for predicting whether the email is malicious. As an additional example, in some cases, if the email security system determines that the email includes the first image via a URL, the system determines whether the URL is associated with the first entity (e.g., is a legitimate URL for the brand) and then uses this latter determination as a feature for predicting whether the email is malicious. As a further example, in some cases, if the email security system determines that the email includes the first image via an image attachment or a URL, the system determines whether the email originates from the first entity (e.g., is sent from a legitimate email server of the brand) and then uses this latter determination as a feature for predicting whether the email is malicious.

In some cases, to determine whether an email includes the first image via a URL, the email security system determines which markup payload of the email includes the first image. For example, the email security system may determine the markup payload whose image similarity score in relation to the first image exceeds the threshold. After detecting the markup payload that includes the first image, the email security system determines whether the markup payload includes a link to an image. In some cases, the email security system determines whether the email includes the first image via a URL based at least in part on determining that markup payload that includes the first image includes a link to an image. In some cases, the email security system determines whether the email includes the first image via a URL based at least in part on determining that markup payload that includes the first image includes a link to an image and that the linked image has a similarity score in relation to the first image that exceeds a threshold.

In some cases, to determine whether an email includes the first image via an attachment, the email security system determines which markup payload of the first email includes the first image. For example, the email security system may determine the markup payload whose image similarity score in relation to the first image exceeds the threshold. After detecting the markup payload that includes the first image, the email security system determines whether the detected payload corresponds to an image file attachment.

In some cases, to determine whether an email includes the first image via a drawing code segment or a style sheet segment, the email security system determines whether the first email's markup payload includes any drawing code segments or style sheet code segments. Examples of style sheet code segments include CSS code segments. Examples of drawing code segments include code segments corresponding to HTML drawing functionalities, such as Scalable Vector Graphics (SVGs), canvas elements, or data URLs.

In some cases, the email security system determines a first prediction about an email based on one or more factors, such as based on at least one of the following: (i) whether the first image is attached to the email as an image file, (ii) whether the first image is associated with a first uniform resource locator (URL) in the first markup payload, (iii) whether the first image is associated with a style sheet code segment in the email's markup payload, or (iv) whether the first image is associated with a drawing code segment in the email's markup payload. In some cases, this first prediction is one of the D predictions determined by D maliciousness detector models. In some cases, given D maliciousness detector models used to determine a maliciousness prediction for an email, the maliciousness prediction for the email includes a single score (e.g., a discrete or continuous score) determined by aggregating the D predictions generated by the D maliciousness detector models. The aggregation may be performed using an ensemble model. In some cases, given D maliciousness detector models used to determine a maliciousness prediction for an email, the maliciousness prediction for the email includes D scores, each determined based on the output of a respective one of the D maliciousness detector models. In some cases, given D maliciousness detector models used to determine a maliciousness prediction for an email, the maliciousness prediction for the email includes: (i) D scores each determined based on the output of a respective one of the D maliciousness detector models, and (ii) a single score (e.g., a discrete or continuous score) determined by aggregating the D maliciousness detector models. In some cases, given D maliciousness detector models used to determine a maliciousness prediction for an email, the maliciousness prediction includes a vector of size E. This vector may be determined by processing the D outputs of the D maliciousness detector models using a machine learning model configured to determine an E-sized (e.g., a dimensionality-reduced) transformed representation of the D outputs.

In some cases, the prediction associated with the email is used to determine a maliciousness verdict for the email. In some cases, the maliciousness verdict for an email indicates whether the email is predicted to be associated with a malicious email attack. In some cases, the maliciousness verdict for an email indicates a recommended remedial action for the email security system to perform concerning the email. Examples of remedial actions include blocking the email from being displayed in the inbox of the receiver, harvesting data about a malicious email to generate a maliciousness detector model, storing attacker data associated with a malicious email in a blocklist associated with the email security system, reporting attacker data associated with a malicious email to authorities, and/or the like. As described above, in some cases, the maliciousness verdict for an email is determined based on D maliciousness predictions by D maliciousness detector models.

In some cases, the techniques described herein can improve the effectiveness of an email security system by enabling the email security system to detect malicious emails based on visual indicators represented by holistic renderings of the emails. As described above, because of the complexity of markup languages, it may be challenging to infer all of the predictively significant features from the markup payloads of emails. In some cases, to address this challenge, the techniques described herein use image data determined by rendering the markup payload of an email to detect whether the email is malicious. Accordingly, by detecting malicious attacks based on holistic visual indicators, the techniques described herein improve an email security system's effectiveness and enhance computer system security.

In some cases, the techniques described herein can improve an email security system's computational efficiency and operational speed. As described above, in some cases, one objective behind rendering the markup payload of the email is to avoid the need for processing the various complex markup elements of the markup payload, a task that has become more and more difficult as more complex markup languages (e.g., HTML 5) are developed. For example, in some cases, the HTML payload of the email can have complex CSS elements. In some cases, using the techniques described herein to avoid the need for individual processing of complex markup elements with varied visual effects, the email security system renders a markup payload of the email and uses the resulting image data to classify the email. Accordingly, by detecting malicious attacks based on holistic visual indicators determined based on the markup payload of an email and thus avoiding the need to process complex markup payload elements, the techniques described herein improve the computational efficiency and the operational speed of an email security system.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system architecture 100 of an example email security system 102 that generates a maliciousness verdict for an email and determines whether to perform a remedial action with respect to the email based on the maliciousness verdict of the email.

In some instances, the email security system 102 may be a scalable service that includes and/or runs on devices housed or located in one or more data centers, that may be located at different physical locations. In some examples, the email security system 102 may be included in an email platform and/or associated with a secure email gateway platform. The email security system 102 and the email platform may be supported by networks of devices in a public cloud computing platform, a private/enterprise computing platform, and/or any combination thereof. The one or more data centers may be physical facilities or buildings located across geographic areas that designated to store networked devices that are part of and/or support the email security system 102. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth).

The email security system 102 may be associated with an email service platform may generally comprise any type of email service provided by any provider, including public email service providers (e.g., Google Gmail, Microsoft Outlook, Yahoo! Mail, AIL, etc.), as well as private email service platforms maintained and/or operated by a private entity or enterprise. Further, the email service platform may comprise cloud-based email service platforms (e.g., Google G Suite, Microsoft Office 365, etc.) that host email services. However, the email service platform may generally comprise any type of platform for managing the communication of email communications between clients or users. The email service platform may generally comprise a delivery engine behind email communications and include the requisite software and hardware for delivering email communications between users. For instance, an entity may operate and maintain the software and/or hardware of the email service platform to allow users to send and receive emails, store, and review emails in inboxes, manage and segment contact lists, build email templates, manage and modify inboxes and folders, scheduling, and/or any other operations performed using email service platforms.

The email security system 102 may be included in, or associated with, the email service platform. For instance, the email security system 102 may provide security analysis for emails communicated by the email service platform (e.g., as a secure email gateway). As noted above, the second computing infrastructure may comprise a different domain and/or pool of resources used to host the email security system 102.

The email service platform may provide one or more email services to users of user device to enable the user devices to communicate emails over one or more networks 108, such as the Internet. However, the network(s) 108 may generally comprise one or more networks implemented by any viable communication technology, such as wired and/or wireless modalities and/or technologies. The network(s) 108 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The network(s) 108 may include devices, virtual resources, or other nodes that relay packets from one device to another.

As illustrated, the user devices may include sending devices 104 that send emails and receiving devices 106 that receive the emails. The sending devices 104 and receiving devices 106 may comprise any type of electronic device capable of communicating using email communications. For instance, the devices 104/106 may include one or more of different personal user devices, such as desktop computers, laptop computers, phones, tablets, wearable devices, entertainment devices such as televisions, and/or any other type of computing device. Thus, the user devices 104/106 may utilize the email service platform to communicate using emails based on email address domain name systems according to techniques known in the art.

The email service platform may receive incoming emails 114, such as the incoming email 114, that are destined for the receiving devices 106 that have access to inboxes associated with destination email addresses managed by, or provided by, the email service platform. That is, emails are communicated over the network(s) 108 to one or more recipient servers of the email service platform, and the email service platform determines which registered user the email is intended for based on email information such as "To," "Cc," Bcc," and the like. In instances where a user of the receiving device 106 have registered for use of the email security system 102, an organization managing the user devices 104/106 has registered for use of the email security system 102, and/or the email service platform itself has registered for use of the email security system 102, the email service platform may provide the appropriate emails for pre-pre-processing of the security analysis process.

In some cases, the email security system 102 may determine a maliciousness verdict for an incoming email 114 using the maliciousness verdict determination process 112. The maliciousness verdict may then be used to determine whether an incoming email 114 should be blocked or instead should be provided to the receiving devices 106 as an allowed email 110. To determine the maliciousness verdict, the email security system 102 may analyze the email metadata with reference to the security policies to determine whether or not the email metadata violates one or more security policies that indicate the respective email is potentially malicious. In some instances, rule-based heuristics may be developed to identify malicious emails based on different words, patterns, and/or other information included in the emails. As another example, machine learning model(s) may be trained using emails where malicious emails are labeled as malicious and benign or normal emails are labeled as benign. The machine learning model(s) and/or the rule-based heuristics may output probabilities that emails are malicious, or may simply output a positive or negative result as to whether the emails are malicious or not.

As depicted in FIG. 1, at operation (1), the email security system 102 may receive an incoming email 114. For example, the email security system 102 may receive the incoming email 114 from one of the sending devices 104.

As further depicted in FIG. 1, at operation (2), the email security system 102 may determine whether incoming email 114 discusses an entity. In some cases, to determine whether the email discusses, the email security system 102 first determines text data 118 for the incoming email 114 and then determines whether the text data 118 discusses the entity. If the email security system 102 determines that the text data 118 of the incoming email 114 contains a discussion of a particular entity, the email security system 102 may determine that the particular entity is a detected entity 120 associated with the incoming email 114.

In some cases, text data 118 associated with the incoming email 114 include text segments associated with each markup payload of the incoming email 114. For example, if one of the attachments to the incoming email 114 includes a markup file (e.g., an HTML file), then the text data associated with the incoming email 114 include both text data in the main markup payload of the incoming email 114 as well as the text data in the markup payload of the attachment. In some cases, the text data 118 associated with the incoming email 114 include text segments associated with each webpage whose URL is in a markup payload associated with the incoming email 114.

In some cases, to determine whether the text data 118 for the incoming email 114 discusses an entity, the email security system 102 determines whether the text data 118 satisfies at least one textual pattern (e.g., at least one word occurrence pattern and/or at least one regular expression pattern) associated with the entity. In some cases, to determine whether the text data associated with the incoming email 114 contains a discussion of an entity, the email security system 102 generates a text representation of text data 118 and provides the text representation of the email to a regression model (e.g., a regression model with one or more neural network layers). The regression model may then determine a score representing the likelihood that the text data 118 contains a discussion of the entity. In some cases, to determine whether the incoming email 114 includes a discussion of an entity, the email security system 102 determines an entity score for the incoming email 114 concerning the particular entity. The entity score for the particular entity may represent the computed likelihood that the incoming email 114 discusses the particular entity. The email security system 102 may then determine that the incoming email 114 discusses the particular entity if the entity score exceeds an entity score threshold.

As further depicted in FIG. 1, at operation (3), the email security system 102 may determine image data 116 for the incoming email 114 by rendering each markup payload of the incoming email 114. In some cases, to render a markup payload of an incoming email 114, the email security system 102 renders a webpage based on the markup payload and captures a screenshot of the webpage. In some cases, to render a markup payload of an incoming email 114, the email security system 102 renders a webpage based on the markup payload and prints the webpage into an image-based file (e.g., into a JPEG file, into a PDF file, and/or the like). In some cases, to render the markup payload of an incoming email 114, the email security system 102 provides the markup payload to a rendering engine that provides an image of the markup payload in response to the markup payload. In some cases, operation (3) is performed based on (e.g., in response to) determining that the text data 118 for the incoming email 114 includes a discussion of a first entity at operation (2).

As further depicted in FIG. 1, at operation (4), the email security system 102 may determine whether the image data 116 for the incoming email 114 includes an entity image 122 associated with the detected entity 120. In some cases, if the image data 116 includes P images, the email security system 102 may determine that the image data 116 includes the entity image 122 if at least one of the P images has a similarity score 126 relative to the first image that exceeds a similarity score threshold. In some cases, given P images in the image data and G images associated with the detected entity 120, the email security system 102 uses an image processing model 124 to determine P*G similarity scores, each associated with a respective image in the image data and a respective image associated with the detected entity 120. In some cases, if at least one of the similarity scores associated with an entity image (e.g., the entity image 122) exceeds the threshold, the email security system 102 determines that the incoming email 114 includes that entity image. Accordingly, in some cases, an email may include more than one entity image 122 associated with the detected entity 120. In some cases, if at least one rendered image in the image data 116 of the incoming email 114 depicts at least one entity image 122 associated with the detected entity 120, then the email security system 102 determines that the incoming email 114 includes a depiction of the detected entity 120. In some cases, operation (4) is performed based on (e.g., in response to) determining that the text data 118 for the incoming email 114 includes a discussion of a first entity (e.g., the detected entity 120) at operation (2).

As further depicted in FIG. 1, at operation (5), the email security system 102 may determine whether the entity image 122 associated with the detected entity 120 is inserted to the incoming email 114 via a URL or an image attachment. In some cases, operation (4) is performed based on (e.g., in response to) determining that the text data 118 for the incoming email 114 includes a discussion of a first entity (e.g., the detected entity 120) at operation (2) and that the image data 116 for the incoming email 114 includes a first image (e.g., the entity image 122) of the first entity at operation (4).

In some cases, to determine whether the incoming email 114 includes the first image via a URL, the email security system 102 determines which markup payload of the incoming email 114 includes the first image. After detecting the markup payload that includes the first image, the email security system 102 determines whether the markup payload includes a link to an image. In some cases, the email security system 102 determines whether the incoming email 114 includes the first image via a URL based at least in part on determining that markup payload that includes the first image includes a link to an image. In some cases, the email security system 102 determines whether the incoming email 114 includes the first image via a URL based at least in part on determining that markup payload that includes the first image includes a link to an image and that the linked image has a similarity score in relation to the first image that exceeds a threshold. In some cases, to determine whether the incoming email 114 includes the first image via a URL, the email security system 102 determines which markup payload of the first email includes the first image. After detecting the markup payload that includes the first image, the email security system 102 may determine whether the detected payload corresponds to an image file attachment.

As further depicted in FIG. 1, at operation (6), the email security system 102 may determine a maliciousness verdict for the incoming email 114 based on determining that the entity image 122 associated with the detected entity 120 is not inserted to the incoming email 114 via a URL or an image attachment. For example, in some cases, if the email security system 102 determines that the incoming email 114 does not include the entity image 122 via a URL or an image attachment, the email security system 102 uses this determination as a feature for predicting whether the incoming email 114 is malicious.

In some cases, the email security system 102 determines a first prediction about the incoming email 114 based on one or more factors, such as based on at least one of the following: (i) whether the entity image 122 is attached to the incoming email 114 as an image file, (ii) whether the entity image 122 is associated with a first uniform resource locator (URL) in a markup payload of the incoming email 114, (iii) whether the entity image 122 is associated with a style sheet code segment in one of the email's markup payloads, or (iv) whether the detected image 122 is associated with a drawing code segment in one of the email's markup payloads. In some cases, this first prediction is one of D predictions determined by D maliciousness detector models. In some cases, given D maliciousness detector used to determine a maliciousness prediction for the incoming email 114, the maliciousness prediction for the email includes a single score (e.g., a discrete or continuous score) determined by aggregating the D predictions generated by the D maliciousness detector models. The aggregation may be performed using an ensemble model.

In some cases, the email security system 102 determines a maliciousness verdict for the incoming email 114. In some cases, the maliciousness verdict for the incoming email 114 indicates whether the incoming email 114 is predicted to be associated with a malicious email attack. In some cases, the maliciousness verdict for the incoming email 114 indicates a recommended remedial action for the email security system 102 to perform concerning the email. Examples of remedial actions include blocking the incoming email 114 from being displayed in the inbox of the receiver, harvesting data about a malicious email to generate a maliciousness detector model, storing attacker data associated with a malicious email in a blocklist associated with the email security system 102, reporting attacker data associated with a malicious email to authorities, and/or the like.

Figure 2:
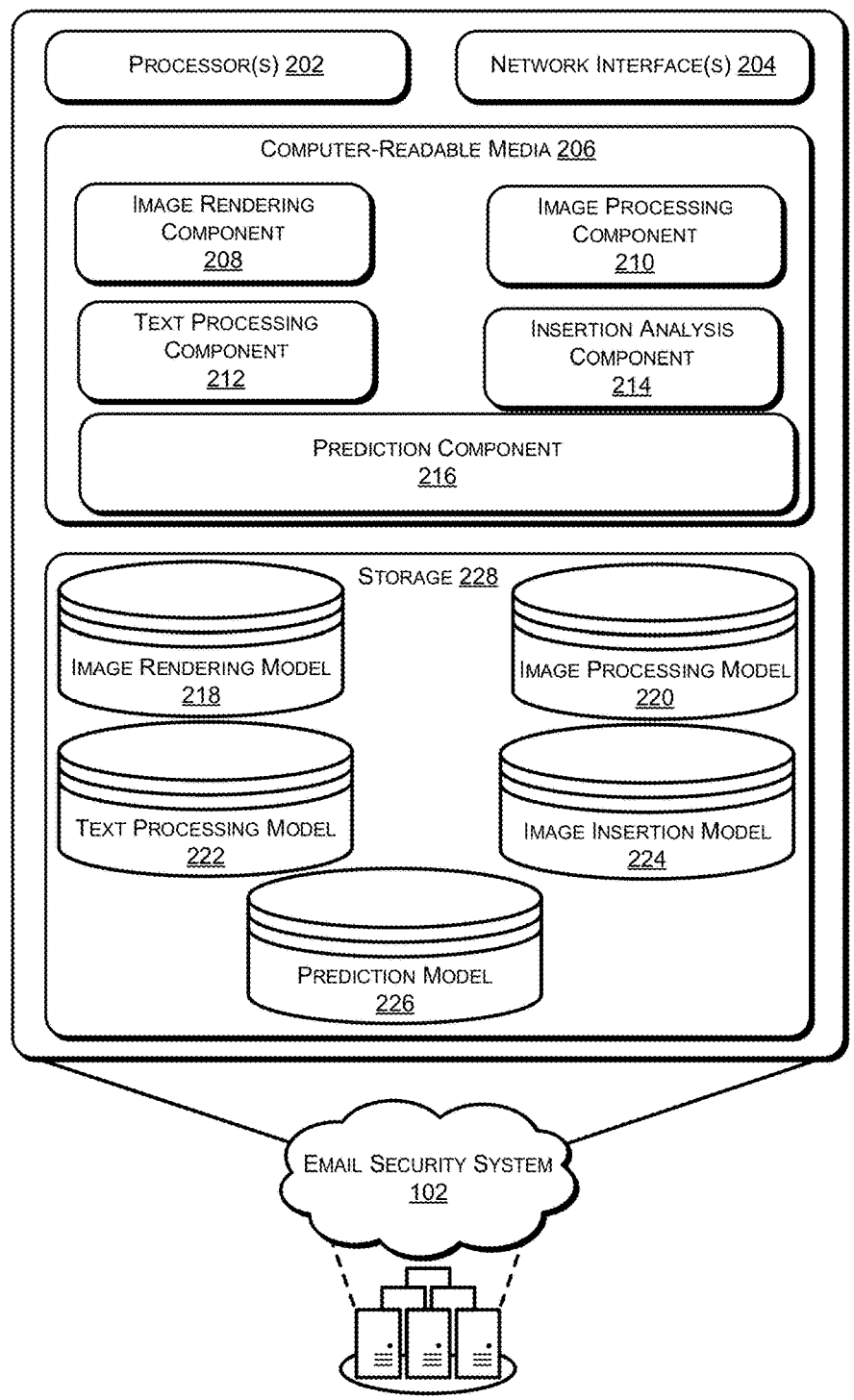
FIG. 2 illustrates a component diagram of an email security system.

FIG. 2 illustrates a component diagram 200 of the example email security system 102 of FIG. 1. As depicted in FIG. 1, the email security system 102 may include one or more hardware processors 202 (processors), which may be one or more devices configured to execute one or more stored instructions. The processor(s) 202 may comprise one or more cores. Further, the email security system 102 may include one or more network interfaces 204 configured to provide communications between the email security system 102 and other devices, such as the sending device(s) 104, receiving devices 106, and/or other systems or devices associated with an email service providing the email communications. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi™, and so forth.

The email security system 102 may also include computer-readable media 206 that stores various executable components (e.g., software-based components, firmware-based components, etc.). The computer-readable media 206 may store components to implement functionality described herein. While not illustrated, the computer-readable media 206 may store one or more operating systems utilized to control the operation of the one or more devices that comprise the email security system 102. According to one embodiment, the operating system comprises the LINUX operating system. According to another embodiment, the operating system(s) comprise the WINDOWS® SERVER operating system from MICROSOFT Corporation of Redmond, Washington. According to further embodiments, the operating system(s) can comprise the UNIX operating system or one of its variants. It should be appreciated that other operating systems can also be utilized.

Additionally, the email security system 102 may include storage 228 which may comprise one, or multiple, repositories or other storage locations for persistently storing and managing collections of data such as databases, simple files, binary, and/or any other data. The storage 228 may include one or more storage locations that may be managed by one or more storage/database management systems. For example, the storage 228 may store an image rendering model 218 that includes computer-readable instructions for rendering a markup payload, such as the markup payload of an email. As another example, the storage 228 may include an image processing model 220 that includes computer-readable instructions for determining a similarity score for two images. As another example, the storage 228 may include a text processing model 222 that includes computer-readable instructions for determining whether text data associated with an email includes a discussion of a first entity. As an additional example, the storage 228 may include an insertion analysis model 224 that includes computer-readable instructions for determining whether an entity image is inserted into an email using a URL or an image attachment. As an additional example, the storage 228 may include a prediction model 226 that includes computer-readable instructions for determining at least one prediction for an email based on the determination about whether an entity image is inserted into the email using a URL or an image attachment.

The computer-readable media 206 may include portions, or components, that configure the email security system 102 to perform various operations described herein. For example, an image rendering component 208 may be configured to execute instructions of the image rendering model 218 to render a markup payload of an email. As another example, the image processing component 210 may be configured to execute instructions of the image processing model 220 to determine a similarity score for two images. As yet another example, the text encoder component 212 may be configured to execute instructions of the text processing model 222 to determine whether the text data for an email includes a discussion of an entity. As another example, the insertion analysis component 214 may be configured to perform operations of the insertion analysis model 224 to determine whether an entity image is inserted into an email using a URL or an image attachment. As a further example, the prediction component 216 may configured to execute instructions of the prediction model 226 to determine at least one prediction for an email based on the determination about whether an entity image is inserted into the email using a URL or an image attachment.

Figure 3:
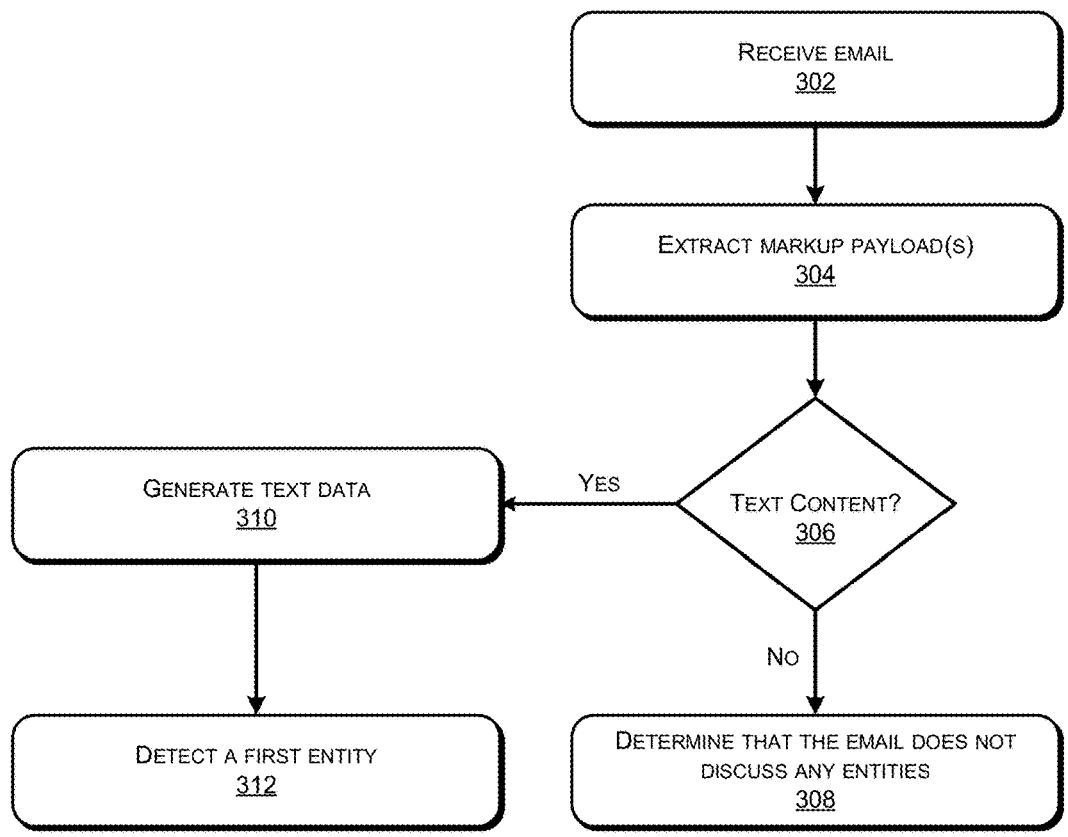
FIG. 3 provides a flowchart diagram of an example process for detecting an entity in an email.

FIG. 3 provides a flowchart diagram of an example process 300 for detecting an entity in an email. As depicted in FIG. 3, at operation 302, the process 300 includes receiving an email. In some cases, the email is associated with one or more markup payloads (e.g., one or more HTML payloads).

At operation 304, the process 300 includes extracting the markup payloads of the email. In some cases, the email is associated with a plurality of markup payloads. A markup payload may comprise one or more code segments, such as HTML or XML code segments, that describe the structure and content of the email.

At operation 306, the process 300 includes determining whether the email is associated with text data. In some cases, an email security system determines that the email is associated with text data based at least in part on whether a text-receiving field/tag of a markup payload of the email includes a text string parameter. Examples of text-receiving tags include the following HTML tags: <h1></h1> or <p></p>. In some cases, an email security system determines that the email is associated with text data based at least in part on whether a markup payload of the email includes any text contents.

At operation 308, the process 300 includes determining that email does not discuss any entities based on (e.g., in response to) determining that the email does not include any text data. In some cases, text analysis is one preliminary step for detecting whether the email includes an entity image using suspicious means. Accordingly, without having text data, the overall detection process is aborted due to the failure to perform this preliminary step.

At operation 310, the process 300 includes generating text data for the email based on (e.g., in response to) determining that the email includes text data. In some cases, text data associated with an email include text segments associated with each markup payload of the email. For example, if one of the attachments to the email includes a markup file (e.g., an HTML file), then the text data associated with the email include both text data in the main markup payload of the email as well as the text data in the markup payload of the attachment. In some cases, the text data associated with an email include text segments associated with each webpage whose URL is in a markup payload associated with the email.

At operation 312, the process 300 includes detecting whether the text data associated with the email discuss an entity based on (e.g., in response to) determining that the email includes text data. In some cases, to determine whether the text data discusses a first entity, an email security system determines whether the text data satisfies at least one textual pattern (e.g., at least one word occurrence pattern and/or at least one regular expression pattern) associated with the first entity. In some cases, if the email security system determines that the text data satisfies at least one textual pattern associated with the first entity, the email security system determines that the email contains a discussion of the first entity. In some cases, if the email security system determines that the text data does not satisfy any textual pattern associated with the first entity, the email security system determines that the email does not contain a discussion of the first entity.

Figure 4:
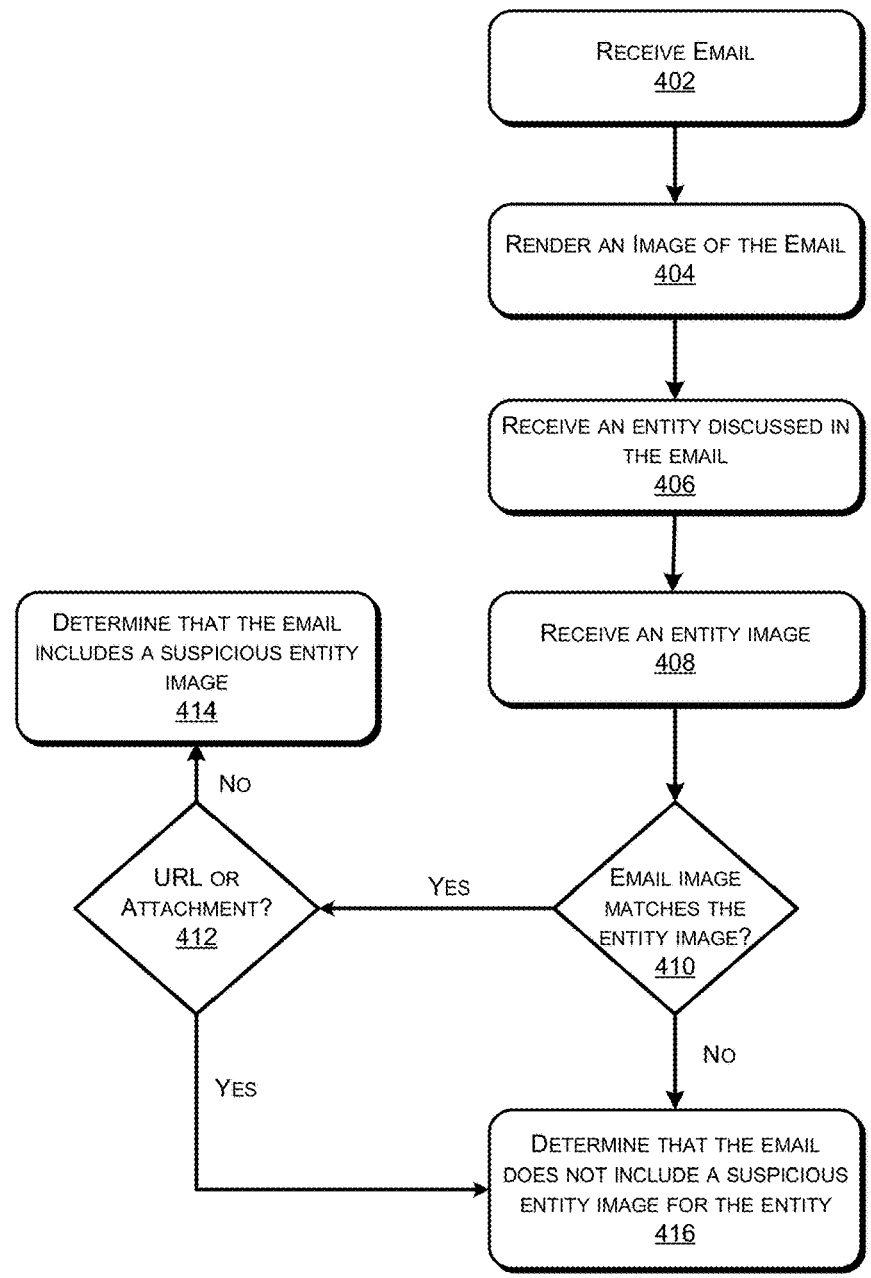
FIG. 4 is a flowchart diagram of an example process for determining whether an entity image is inserted into an email in a suspicious manner.

FIG. 4 is a flowchart diagram of an example process 400 for determining whether an entity image is inserted into an email in a suspicious manner. As depicted in FIG. 4, at operation 402, the process 400 includes receiving the email. In some cases, the email is associated with one or more markup payloads (e.g., one or more HTML payloads).

At operation 404, the process 400 includes generating image data for the email. In some cases, to determine the image data for the email, an email security system renders each markup payload (e.g., an HTML payload) of the email. In some cases, to render a markup payload of an email, an email security system renders a webpage based on the markup payload and captures a screenshot of the webpage.

At operation 406, the process 400 includes receiving a first entity discussed in the email. In some cases, the first entity is an entity discussed in text data associated with the email. In some cases, to determine whether the text data discusses a first entity, an email security system determines whether the text data satisfies at least one textual pattern (e.g., at least one word occurrence pattern and/or at least one regular expression pattern) associated with the first entity. In some cases, to determine whether the text data associated with the email contains a discussion of the first entity, the email security system generates a text representation of the email and provides the text representation of the email to a regression model (e.g., a regression model with one or more neural network layers). The regression model may then determine a score representing the likelihood that the text data contains a discussion of the first entity.

At operation 408, the process 400 includes an entity image of the first entity. For example, the entity image may be an image of a symbol (e.g., logo) associated with the first entity. In some cases, the entity image can be retrieved from an entity image database (e.g., a logo database).

At operation 410, the process 400 includes determining whether an image in the email's image data matches the entity image. In some cases, an email security system determines that two images match if a similarity score for the two images exceeds a threshold. In some cases, the image similarity scores are determined by an image processing machine learning model.

At operation 412, the process 400 includes determining whether the entity image is inserted into the email using a URL or an image attachment based on (e.g., in response to) determining that the image in the email's image data matches the entity image. In some cases, an email security system determines whether the markup payload that includes the entity image includes a link to an image. In some cases, an email security system determines whether the markup payload that includes the entity image includes a link to an image and, if so, whether a link to an image and that the linked image has a similarity score in relation to the first image that exceeds a threshold.

At operation 414, the process 400 includes determining that the email includes a suspicious entity image based on (e.g., in response to) determining that the entity image matches an email image and that the entity image is not inserted into the email using a URL or an image attachment. In some cases, based on (e.g., in response to) determining that the entity image matches an email image and that the entity image is not inserted into the email using a URL or an image attachment, an email security system generates a suspicious image signal because it detects an entity image that is inserted using markup functionalities that prevent other maliciousness detector models from detecting the entity image's insertion.

At operation 416, the process 400 includes determining that the email does not include a suspicious entity image based on (e.g., in response to): (i) determining that no entity image does matches one of images in the image data for the email, or (ii) determining that the entity image matches an email image and that the entity image is inserted into the email using a URL or an image attachment. In some cases, in response to determining that none of the images associated with the email matches an entity image, an email security system determines that the email does not have imagery corresponding to the entity. Accordingly, the email security system may determine that the email does not include a suspicious image associated with the entity. In some cases, in response to determining that one of the images associated with the email matches an entity image but that the entity image is inserted using a URL or an image attachment, an email security system does not generate a suspicious image signal because other maliciousness detector models analyze URLs and image attachments associated with the email.

Figure 5:
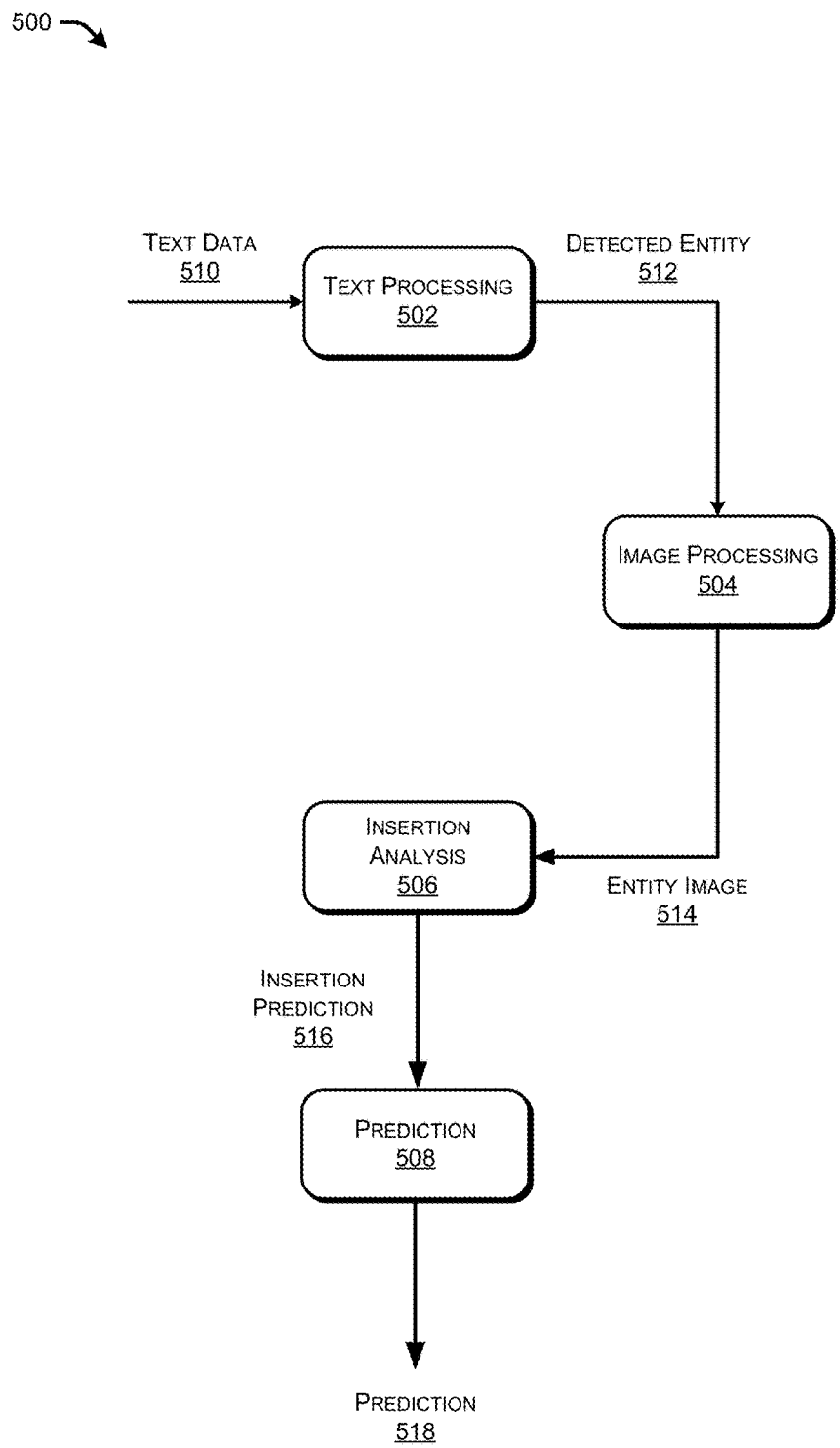
FIG. 5 is a data flow diagram of an example process for determining a prediction about an email.

FIG. 5 is a data flow diagram of an example process 500 for determining a prediction 518 about an email. As depicted in FIG. 5, the process 500 includes receiving text data 510 associated with the email. In some cases, text data 510 associated with an email include text segments associated with each markup payload of the email. For example, if one of the attachments to the email includes a markup file (e.g., an HTML file), then the text data 510 associated with the email include both text data in the main markup payload of the email as well as the text data in the markup payload of the attachment.

As further depicted in FIG. 5, the process 500 includes processing the text data 510 using a text processing model 502 to detect a discussion of an entity 512 in the email. In some cases, the text processing model 502 uses one or more natural language processing models to determine that the corresponding email includes the discussion of the detected entity 512. In some cases, the text processing model generates a vector of size B, where each value of the vector represents a computed likelihood that the email contains discussion of a corresponding one of B entities. In some cases, if the computed likelihood value for an entity exceeds a threshold, then an email security system determines that the email contains a discussion of the entity.

As further depicted in FIG. 5, the process 500 includes determining, based on the detected entity 512 and using an image processing model 504, that the email includes an image 514 of the entity. In some cases, the image processing model 504 detects at least one of the entity's images that matches an image generated by rendering a markup payload of the email. In some cases, the entity image 514 is an image associated with the detected entity 512 that matches at least one image generated by rendering a markup payload of the email. In some cases, an email security system determines that two images (e.g., an entity image and an image generated by rendering a markup payload) match if an image similarity score for the two images exceeds a threshold. The image similarity scores for image pairs may be generated by the image processing model 504.

As further depicted in FIG. 5, the process 500 includes determining, based on the entity image 514 and using an insertion analysis model 506, an insertion prediction 516. The insertion prediction 516 may be a computed determination about whether the email contains the entity image 514 using a URL or as an image attachment. In some cases, the insertion analysis model 502 is configured to generate the insertion prediction 516, for example by performing static analysis on one or more markup payloads associated with the email.

As further depicted in FIG. 5, the process 500 includes determining, based on the insertion prediction 516 and using a prediction model 508, the prediction 518 for the email. In some cases, the prediction model 508 includes one or more feedforward fully-connected neural network layers. In some cases, the prediction model 508 uses an ensemble learning mechanism. In some cases, the prediction 518 indicates a classification about the email, such as a classification about whether the email is predicted to be malicious, a classification about a level of confidence in a prediction that the email is malicious, a classification that represents a recommended responsive action for the email, and/or the like. In some cases, the prediction 518 includes a regression output, such as a regression output that indicates a computed probability that the email is malicious. In some cases, the prediction 518 represents at least one responsive action associated with the email.

Figure 6:
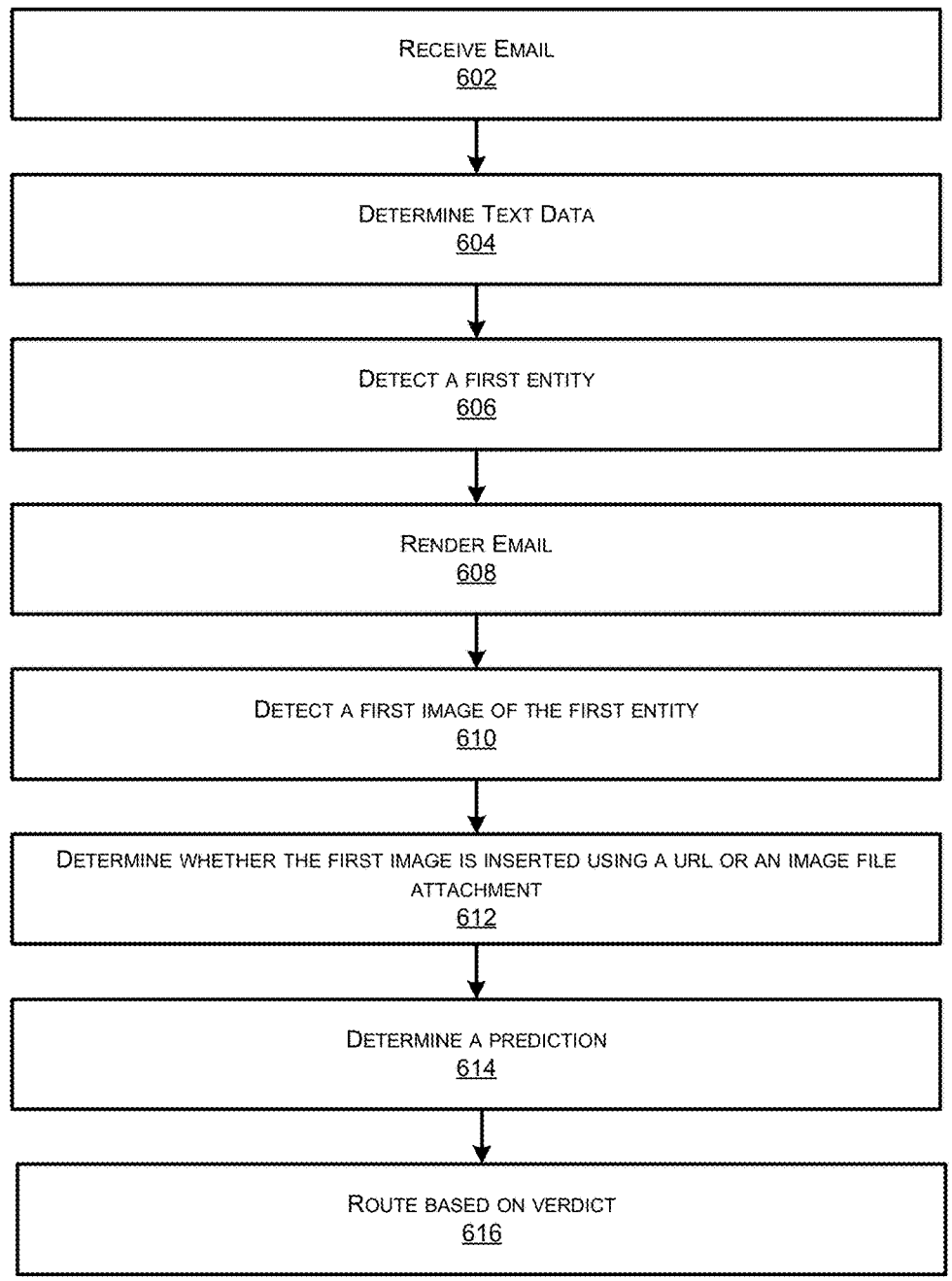
FIG. 6 is a flowchart diagram of an example process for routing an email based on a prediction associated with the email.

FIG. 6 is a flowchart diagram of an example process 600 for routing an email based on a prediction for the email. As depicted in FIG. 6, at operation 602, the process 600 includes receiving an email.

At operation 604, the process 600 includes determining text data for the email. In some cases, the text data associated with an email include data in a markup payload of the email that is associated with a payload tag that is configured to indicate an alphanumeric character segment. For example, the text data associated with an email may include data in an HTML payload for the email that is associated with one of the following tags: <h1></h1> or <p></p>.

At operation 606, the process 600 includes detecting a first entity discussed in the email by determining that the text data for the email contains a discussion of the first entity. In some cases, to determine whether the text data discusses a first entity, an email security system determines whether the text data satisfies at least one textual pattern (e.g., at least one word occurrence pattern and/or at least one regular expression pattern) associated with the first entity. In some cases, to determine whether the text data associated with the email contains a discussion of the first entity, the email security system generates a text representation of the email and provides the text representation of the email to a regression model (e.g., a regression model with one or more neural network layers).

At operation 608, the process 600 includes rendering each markup payload associated with the email to generate the image data for the email. In some cases, to render a markup payload of an email, an email security system renders a webpage based on the markup payload and captures a screenshot of the webpage. In some cases, to render a markup payload of the email, the email security system renders a webpage based on the markup payload and prints the webpage into an image-based file. In some cases, to render the markup payload of an email, the email security system provides the markup payload to a rendering engine that provides an image of the markup payload in response to the markup payload.

At operation 610, the process 600 includes detecting a first image associated with the detected entity that is included in the email. In some cases, if the image data associated with the email includes P images, an email security system may determine that the image data includes a first image if at least one of the P images has a similarity score relative to the first image that exceeds a similarity score threshold.

At operation 612, the process 600 includes determining whether the first image is inserted into the email using a URL or an image attachment. In some cases, to determine whether an email includes the first image via a URL, an email security system determines which markup payload of the email includes the first image. After detecting the markup payload that includes the first image, the email security system determines whether the markup payload includes a link to an image.

In some cases, to determine whether an email includes the first image via an attachment, an email security system determines which markup payload of the first email includes the first image. After detecting the markup payload that includes the first image, the email security system determines whether the detected payload corresponds to an image file attachment.

At operation 614, the process 600 includes determining a prediction about the email based on whether the first image is inserted into the email using a URL or an image attachment. The prediction may represent whether the email is malicious. In some cases, if an email security system determines that the email does not include the first image via a URL or an image attachment, the email security system uses this determination as a feature for predicting whether the email is malicious. In some cases, if an email security system determines that the email includes the first image via a URL, the email security system determines the prediction based on whether the URL is a predefined URL associated with the detected entity. In some cases, if the email security system determines that the email includes the first image via an image attachment, the email security system determines the prediction based on whether the attachment contains malicious code.

At operation 616, the process 600 includes determining whether to route the email based on the prediction. For example, in some cases, based on determining that the email is malicious, an email security system recommends that the email should be prevented from reaching the inbox of the email's recipient. As another example, in some cases, based on determining that the email is not malicious, the email security system recommends that the email be provided in the inbox of the email's recipient.

Figure 7:
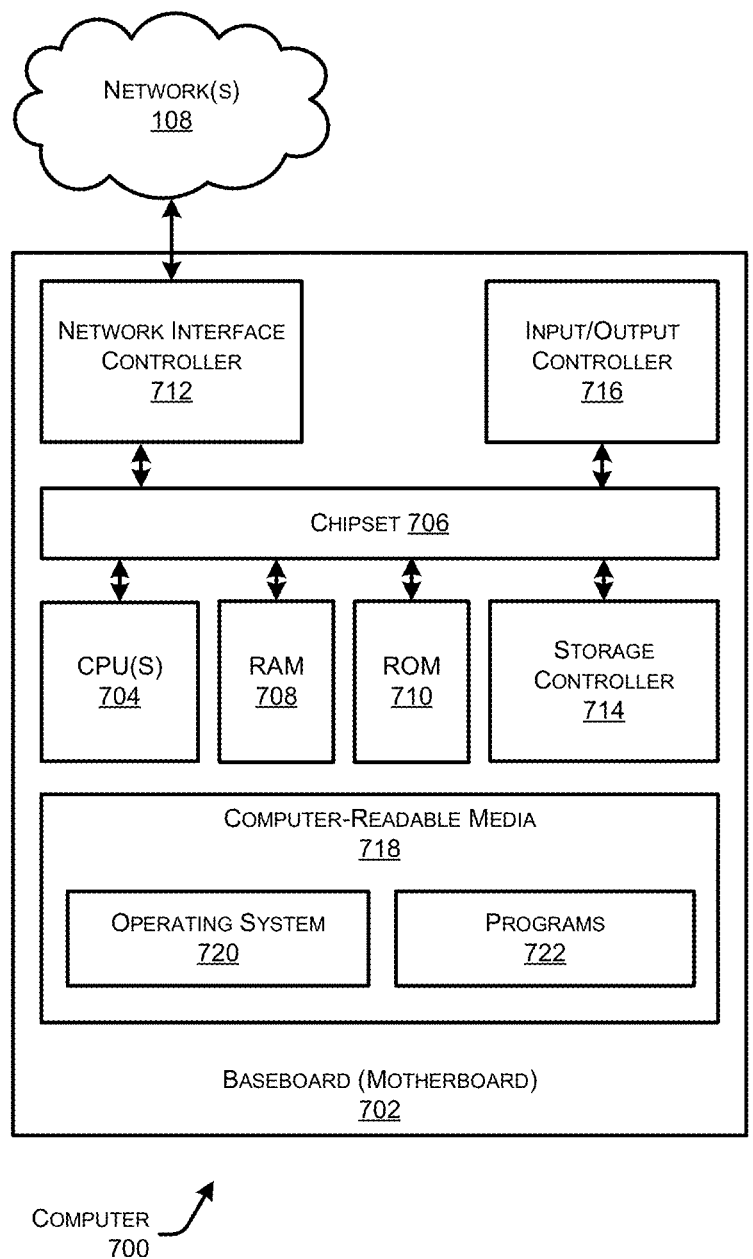
FIG. 7 is a computer architecture diagram showing an illustrative computer hardware architecture for implementing a computing device that can be utilized to implement aspects of the various technologies presented herein.

FIG. 7 shows an example computer architecture for a computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein. The computer 700 may, in some examples, correspond to a physical server that is included in the email security system 102 described herein, and may comprise networked devices such as servers, switches, routers, hubs, bridges, gateways, modems, repeaters, access points, etc.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a RAM 708, used as the main memory in the computer 700. The chipset 706 can further provide an interface to a computer-readable storage medium such as a read-only memory ("ROM") 710 or non-volatile RAM ("NVRAM") for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 108. The chipset 706 can include functionality for providing network connectivity through a NIC 712, such as a gigabit Ethernet adapter. The NIC 712 is capable of connecting the computer 700 to other computing devices over the network 108. It should be appreciated that multiple NICs 712 can be present in the computer 700, connecting the computer to other types of networks and remote computer systems.

The computer 700 can be connected to a storage device 718 that provides non-volatile storage for the computer. The storage device 718 can store an operating system 720, programs 722, and data, which have been described in greater detail herein. The storage device 718 can be connected to the computer 700 through a storage controller 714 connected to the chipset 706. The storage device 718 can consist of one or more physical storage units. The storage controller 714 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description.

Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations are performed by devices in a distributed application architecture, and or any components included therein, may be supported by one or more devices similar to computer 700. Stated otherwise, some or all of the operations performed by the email security system 102, and or any components included therein, may be performed by one or more computers 700 operating in any system or arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 718 can store an operating system 720 utilized to control the operation of the computer 700. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 718 can store other system or application programs and data utilized by the computer 700.

In one embodiment, the storage device 718 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for detecting malicious emails, the method comprising:
   receiving an email, wherein the email is associated with a first markup payload;
   determining, based at least in part on the first markup payload, text data associated with the email;
   determining, based on the text data, whether the email discusses a first entity;
   based at least in part on determining that the email discusses the first entity, rendering the first markup payload to generate image data that represents a rendering of the email;
   determining, based on the image data, whether the email comprises a first image associated with the first entity;
   based at least in part on determining that the email comprises the first image, determining a first prediction about the email based at least in part on at least one of: (i) whether the first image is attached to the email as an image file or (ii) whether the first image is associated with a first uniform resource locator (URL) in the first markup payload; and
   determining a second prediction about the email based at least in part on the first prediction, wherein the second prediction represents whether the email is predicted to be malicious.

2. The method of claim 1, wherein determining the first prediction further comprises:

determining the first prediction based at least in part on whether the first image is associated with a style sheet code segment in the first markup payload.

3. The method of claim 1, wherein determining the first prediction further comprises:
determining the first prediction based at least in part on whether the first image is associated with a drawing code segment in the first markup payload.

4. The method of claim 1, wherein the email is associated with a plurality of markup payloads comprising the first markup payload.

5. The method of claim 4, wherein the text data comprises each text data segment associated with one of the plurality of markup payloads.

6. The method of claim 4, wherein determining whether the email comprises the first image comprises:
for each one of the plurality of markup payloads:
rendering the markup payload to generate a corresponding image, and
determining an image similarity score for the markup payload based on the corresponding image and the first image; and
determining whether the email comprises the first image based at least in part on each image similarity score for one of the plurality of markup payloads.

7. The method of claim 4, wherein the plurality of markup payloads comprise a second markup payloads associated with a first attachment of the email.

8. The method of claim 1, wherein determining the second prediction comprises:
determining the second prediction based at least in part on whether the first prediction represents that the first image is associated with the first URL and whether the first URL is a predefined URL associated with the first entity.

9. The method of claim 1, wherein determining the second prediction comprises:
determining the second prediction based at least in part on whether the first prediction represents that the first image is attached to the email and whether the image file attached to the email contains malicious code.

10. The method of claim 1, further comprising:
based at least in part on determining that the second prediction indicates that the email is malicious, determining a remedial action for the email; and
processing the email based on the remedial action.

11. A system comprising:
one or more processors; and
one or more non-transitory computer-readable media storing computer-executable instructions that, when executed by the one or more processors, cause the one or more processors to perform operations comprising:
receiving an email, wherein the email is associated with a first markup payload;
determining, based at least in part on the first markup payload, text data associated with the email;
determining, based on the text data, whether the email discusses a first entity;
based at least in part on determining that the email discusses the first entity, rendering the first markup payload to generate image data that represents a rendering of the email;
determining, based on the image data, whether the email comprises a first image associated with the first entity;
based at least in part on determining that the email comprises the first image, determining a first prediction about the email based at least in part on at least one of:
(i) whether the first image is attached to the email as an image file or (ii) whether the first image is associated with a first uniform resource locator (URL) in the first markup payload; and
determining a second prediction about the email based at least in part on the first prediction, wherein the second prediction represents whether the email is predicted to be malicious.

12. The system of claim 11, wherein determining the first prediction further comprises:
determining the first prediction based at least in part on whether the first image is associated with a style sheet code segment in the first markup payload.

13. The system of claim 11, wherein determining the first prediction further comprises:
determining the first prediction based at least in part on whether the first image is associated with a drawing code segment in the first markup payload.

14. The system of claim 11, wherein the email is associated with a plurality of markup payloads comprising the first markup payload.

15. The system of claim 14, wherein the text data comprises each text data segment associated with one of the plurality of markup payloads.

16. One or more non-transitory computer-readable media storing computer-executable instructions that, when executed by one or more processors, cause the one or more processors to perform operations comprising:
receiving an email, wherein the email is associated with a first markup payload;
determining, based at least in part on the first markup payload, text data associated with the email;
determining, based on the text data, whether the email discusses a first entity;
based at least in part on determining that the email discusses the first entity, rendering the first markup payload to generate image data that represents a rendering of the email;
determining, based on the image data, whether the email comprises a first image associated with the first entity;
based at least in part on determining that the email comprises the first image, determining a first prediction about the email based at least in part on at least one of:
(i) whether the first image is attached to the email as an image file or (ii) whether the first image is associated with a first uniform resource locator (URL) in the first markup payload; and
determining a second prediction about the email based at least in part on the first prediction, wherein the second prediction represents whether the email is predicted to be malicious.

17. The one or more non-transitory computer-readable media of claim 16, wherein determining the first prediction further comprises:
determining the first prediction based at least in part on whether the first image is associated with a style sheet code segment in the first markup payload.

18. The one or more non-transitory computer-readable media of claim 16, wherein determining the first prediction further comprises:
determining the first prediction based at least in part on whether the first image is associated with a drawing code segment in the first markup payload.

19. The one or more non-transitory computer-readable media of claim 16, wherein the email is associated with a plurality of markup payloads comprising the first markup payload.

20. The one or more non-transitory computer-readable media of claim 19, wherein the text data comprises each text data segment associated with one of the plurality of markup payloads.

* * * * *